United States Patent [19]

Etherington et al.

[11] Patent Number: 5,257,320
[45] Date of Patent: Oct. 26, 1993

[54] SIGNATURE VERIFICATION SYSTEM

[75] Inventors: Harry J. C. Etherington, Godalming; Paul C. Joslin, Bracknell; Timothy J. Stevenson, Ascot, all of United Kingdom

[73] Assignee: ROCC Computers Limited, Sussex, United Kingdom

[21] Appl. No.: 825,835

[22] Filed: Feb. 4, 1986

Related U.S. Application Data

[63] Continuation-in-part of Ser. No. 502,999, Jun. 10, 1983, abandoned.

[30] Foreign Application Priority Data

May 31, 1983 [GB] United Kingdom ............... 8314889

[51] Int. Cl.⁵ ............................................. G06K 9/46
[52] U.S. Cl. ............................................ 382/3; 382/28
[58] Field of Search ..................... 382/3, 13, 28; 340/825.14; 235/380

[56] References Cited

U.S. PATENT DOCUMENTS

| 4,156,231 | 5/1979 | Edamatsu et al. | 382/28 |
| 4,385,285 | 5/1983 | Horst et al. | 382/3 |
| 4,454,610 | 6/1984 | Sziklai | 382/3 |
| 4,495,644 | 1/1985 | Parks et al. | 382/3 |

Primary Examiner—Leo H. Boudreau

[57] ABSTRACT

A system of dissecting a signature by light analysis to produce component digital representations that are processed to a resultant standard signal representing a sample signature. Verification apparatus reduces a test signature to an equivalent signal for comparison with the standard.

12 Claims, 7 Drawing Sheets

FIG. 2.

$V_o(s) \div V_i(s) \dfrac{1}{1+ST}$    $T \div Rc$

SIGNATURE VERIFICATION SYSTEM

This is a continuation-in-part of U.S. patent application Ser. No. 502,999, filed Jun. 10, 1983, and entitled "Signature Verification System", abandoned (by notice letter of Mar. 5, 1986) in favor hereof.

The present invention relates to a system for the verification of signatures by which term we mean to include all identification marks written by individuals.

There have been many proposals for verifying signatures most of which have not been commercially successful for one reason or another but usually because they were not suitable for large scale implementation. Among these previous proposals has been one where a computer stores signals indicative of the variations in motion produced as one writes a signature. This is usually referred to as "dynamic". In order to verify a subsequent signature it is necessary to have the signals indicative of the variations in motion produced by the subsequent signature compared with the signal stored in the computer. Either the success in verifying the subsequent signature is so low at a first attempt at signing that a series of successive signing attempts are necessary or else it is necessary to employ complex correlation algorithms and adaptive learning techniques requiring the apparatus to be directly connected to a host computer at the time of making the subsequent signature which is both inconvenient and expensive for general commercial use.

With cheque and credit card frauds amounting to many millions of pounds per annum in the U.K. alone there is a clear need to produce a system which will be called "static" in that he signature is verified by recognition of the form of the signature after it is written rather than verification by recognition of the manner in which the signature is written and which does not need connection to a computer and yet which will result in a reliable identification of a current signature as well as of a fraudulent signature.

U.S. Pat. No. 4,454,610 discloses a static system for classifying and identifying patterns which may be used to verify signatures. The apparatus consists of an encoding device and a verification device. In the verification device a submitted signature borne on a record medium is imaged by a lens system to produce two optical images. These images are each optically transformed, optically averaged and then converted into electrical signals by vidicon tubes. These signals are combined in such a way that the resultant set of signals is the Fourier transform of the submitted signature. The logarithm of the resultant signals if taken and this final transform is displayed on a screen. A set of fixed detectors measure the intensity values of particular pixels on the screen and this set of values is used to classify/identify the submitted signature. Because of the transformation which has taken place each intensity value represents the strength of a spectral feature in the signature.

An encoded reference pixel arrangement derived from the final transforms of a set of sample signatures the true author is imprinted on the record medium. A second set of fixed detectors measures the intensity of the corresponding pixels to give a set of reference intensity values. One or more microprocessors in the apparatus compares the measured and reference sets of intensity values and produces an output signal. If this output signal is greater than a certain threshold value then the apparatus indicates that the signature is verified.

The encoding device operates in a similar manner to the verification device for producing the final transforms of a set of sample signatures by a given author. One reference pixel arrangement is produced to represent the transform of true signature of the author and a representation of this is imprinted on the record medium (e.g. a cheque).

The apparatus disclosed in U.S. Pat. No. 4,454,610 is large and bulky because of the many components used in the optical imaging, transformation and processing. Also the system is inflexible as only one type of feature of a signature may be used for verification (i.e. the spectral features).

The present invention provides an improved static signature verification system comprising encoding apparatus and verification apparatus.

The present invention provides encoding apparatus which comprises means for scanning an area containing at least a portion of a sample signature to produce a digital representation of the portion of said signature within the scanning area, pre-processing apparatus to selectively smooth the digital representation, means for analysing particular extended features of the pre-processed digital representation to produce measures indicative of said extended features, means for scaling the measures to produce a set of values representative of the sample signature, means for producing a reference set of measure values representative of the signature of a person from at least one sample thereof and means for producing a code indicative of the set of values.

Preferably a number of sample signature (e.g. 6) are scanned and the resultant code is a function of all the signatures so as to take into account random variations in the true signature.

The recording of the code or an encrypted version thereof on a suitable record medium may be by any of several available commercial methods dependent on the application e.g. by printing on a cheque, by embossing on a credit card, by laser or magnetic recording on a strip of recording material on the record medium.

The present invention further provides verification apparatus for use with a record medium which bears the code which as been produced by said encoding apparatus and then recorded by some means as previously described. Also the verification apparatus is for use with a medium bearing the submitted signature. The verification apparatus comprises means for reading the code on the record medium, means for generating a first signal indicative of the extended features of the reference signature represented by the code, means for reading a submitted signature, means responsive to said reading means for generating a second signal representing the extended features of the submitted signature, means for comparing the first signal with the second signal and means for indicating the result of the comparison.

Preferably, the same array of elements is used as both the means for reading the code and for reading the signature, in which case it is convenient if the signature and the code are read sequentially.

Using the above system, the verification apparatus need not be connected to a computer and can be a "stand alone" device since the record medium bears the code which described the reference signature and thus does not require a computer signature data-base. Advantageously, when dealing with banking debit vouchers e.g. cheques, the verification apparatus is provided with a transport mechanism for feeding a cheque past a sensing head for reading the code and the submitted signature. The transport mechanism may be constructed as described in our European publication No. 0127479.

An advantage provided by embodiments of the present invention is that a wide variety of signature features may be used to identify/classify the signature since the means for analysing extended features of the digital representation is adapted to analyse each pixel in relation to the pixels around it thus identifying line edges, directions of sloping lines and a large number of other properties of a signature.

A further advantage provided by embodiments of the present invention is the small size of the apparatus and short processing time in verification which makes the apparatus particularly suitable for commercial use.

Features and advantages of the present invention will become apparent from the following description of an embodiment thereof when taken in conjunction with the accompanying drawings, in which.

The overall system includes encoding apparatus and verification apparatus. In this case, it is more convenient to describe first the verification apparatus and its use and then the describe the encoding apparatus.

The verification apparatus is designed to verify the validity of submitted signatures by comparison of a number of measures determined by scanning each submitted signature, with a similar set of 'reference measures' previously determined by scanning one or more samples of the genuine signature. Typically, a cheque has a signature box defined within which the signature is required to be written preceded by one or more codes, which in the present example are in the form of a block of numbers. Each block of numbers is representative of 'reference measures' determined previously but in encrypted form. More than one code allows for alternative signatures to be accommodated, e.g. for a joint account.

A scanning system is provided which scans both the signature and the or each code. The information provided by the scanning system is converted into digital form ready for processing by a microcomputer system.

The software with which the microcomputer operates performs three main tasks:
(a) It decodes the or each code back to a set of "reference measures";
(b) It takes the data representing the pattern of the signature, pre-processes it and generates a set of measures which, after suitable scaling, correspond to those that make up the set of "reference measures"; and
(c) It compares each scaled signature measure with its equivalent reference measure and generates an overall figure of merit for the two sets as a measure of their similarity.

Thereafter, the figure of merit is matched with previously determined values to indicate the result of the comparison e.g. by visual indication such as a simple pass or fail light or by an actual display of the figure of merit either alone or with the predetermined values thereby to allow the user to decide whether or not to accept a signature.

Figure 1:
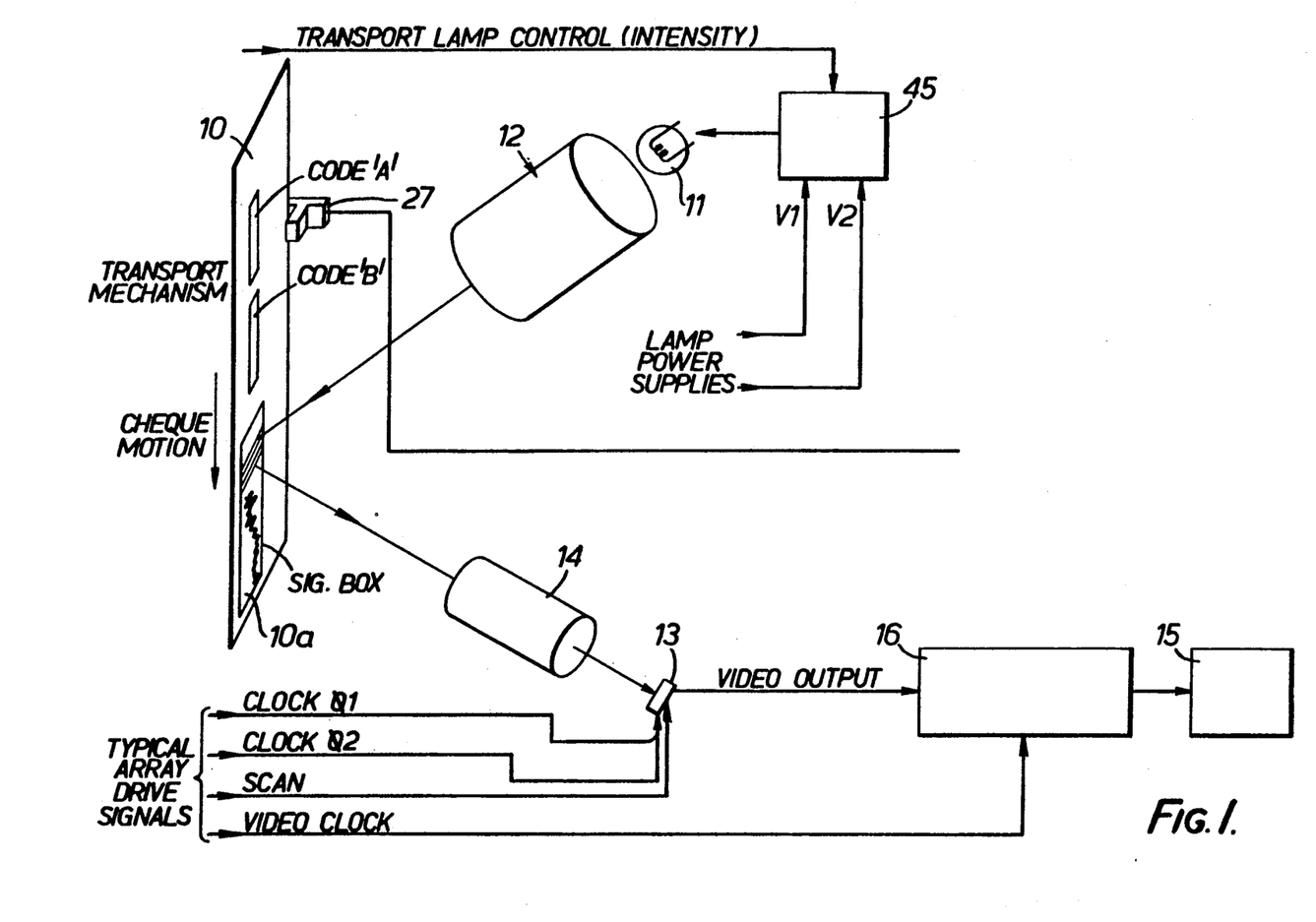
FIG. 1 shows schematically verification apparatus according to the present invention.

Turning now to FIG. 1, a cheque 10 is moved at a constant velocity through a scanning location by a transport system. At the scanning location, an area of the cheque 10 is illuminated by a light source 11 through an optical assembly 12 and the light reflected from the surface of the cheque detected by a linear array of a plurality of photosensitive elements 13 after passing through an optical assembly 14 which is arranged to focus the light from the area of the surface of the cheque on to the array.

The area is large enough to encompass the height of a signature box 10a and the height of the code is chosen to be not greater than this height of signature box. The optical assembly 14 places a magnified image of the area of the cheque being scanned on the array 13 and incorporates filters which permit use of a wide range of colours for the inks with which the submitted signature is written.

In certain embodiments the verification apparatus is specifically blind to one colour in order to allow the signature box of the preferred cheque to be defined by a solid block of this colour rather than by a heavy black outline which will affect the image of the submitted signature produced by the scanning means. A colour such as yellow could be used since this is not generally used when writing a signature.

Embodiments of the present invention process data from inside the signature box on a cheque derived either by just scanning the signature box (and codes where appropriate) or by scanning the whole cheque and determining which video scan data represents the contents of the signature box. The first of these methods of deriving data may be carried out by timing the passage of the cheque through the apparatus, since the velocity of the cheque is known and the position of the signature box on the cheque is predetermined. The second of these methods of deriving data may be carried out by detecting an edge of the signature box in the video data, either the detection of the marked outline of the box or a colour change at the box boundary if a coloured block is used. Combination of timing and marking are also possible.

Figure 2:
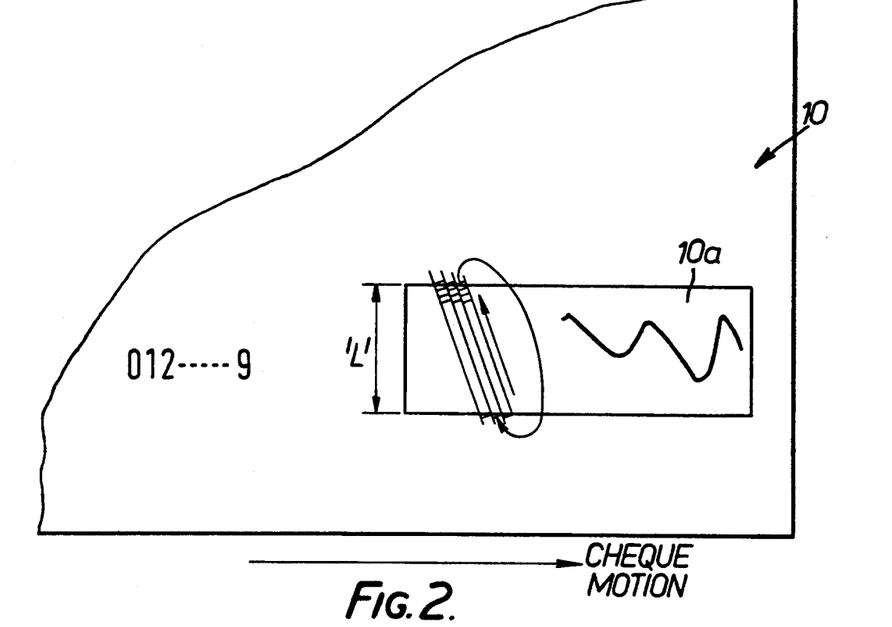
FIG. 2 shows diagrammatically how a cheque is scanned by the apparatus in FIG. 1.

As cheques pass through the scanning location, the array 13 of the photosensitive elements are repeatedly sequentially scanned in one direction as indicated in FIG. 2. The velocity of the cheque 10 is so chosen that in one scan of the array 13 the cheque 10 moves through a distance equivalent to nominally one array element width. Thus a strip of a height equivalent to the height of the signature box 10a of the cheque 10 is scanned from one end of the cheque 10 to the other during its passage through the transport.

Increasing the size of the scanned area would increase the probability that the whole of a signature on the cheque would be scanned and used in producing measure values, thus in some cases increasing the amount of the signature that a forger would have to reproduce accurately. However, a larger scanning array and larger amount of computer memory would be needed increasing the size and cost of the apparatus.

The array element width is selected to give high resolution information about the submitted signature. Ink lines in a signature are commonly about 0.75 mm thick so the array element width should be at most half that figure to allow the edges of the ink lines to be identified.

A video output signal is derived from the array 13 as a result of each sequential scan of the array elements and is therefore serial in nature. A SCAN PULSE and CLOCK PULSES $\phi1$ and $\phi2$ are generated by a computer 15 and fed to the array 13. The SCAN PULSE initiates each scan of the array and is also fed to other parts of the apparatus, as will be described in detail in relation to FIG. 3A to demarcate each scan within the software of the computer. The video output is thus in the form of a succession of packets of charge each being a measure of the integral of the light energy which has fallen on a particular array element during one scan period. The video signal is fed to a video signal processor 16 where the packets of charge are processed to provide a continuous analogue signal for each scan. To this end, a VIDEO CLOCK signal is fed to the processor 16 from the computer 15.

Figure 3A:
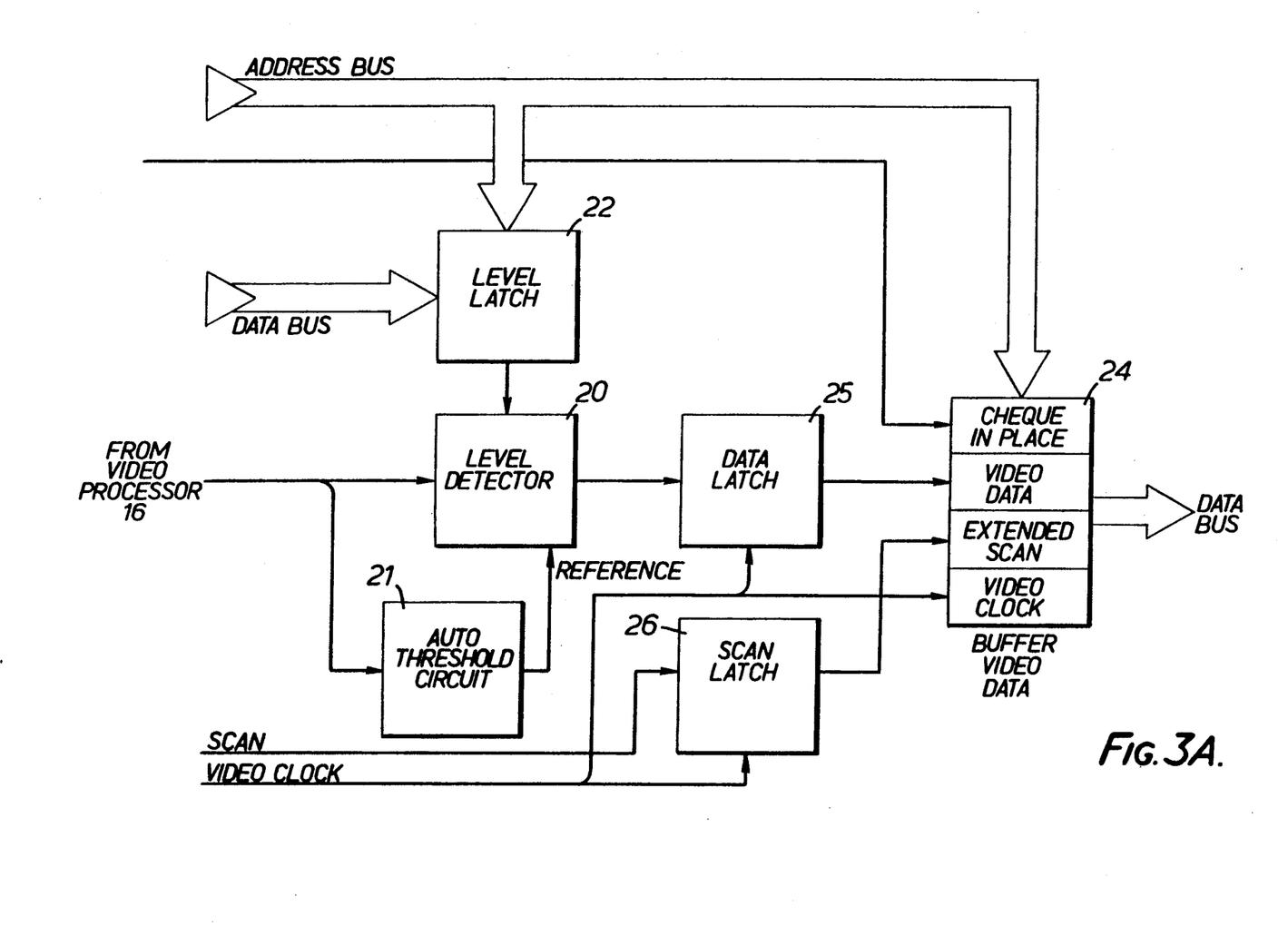
FIGS. 3A and 3B show a block schematic circuit diagram of the computer used in the verification apparatus shown in FIG. 1.
Figure 3B:
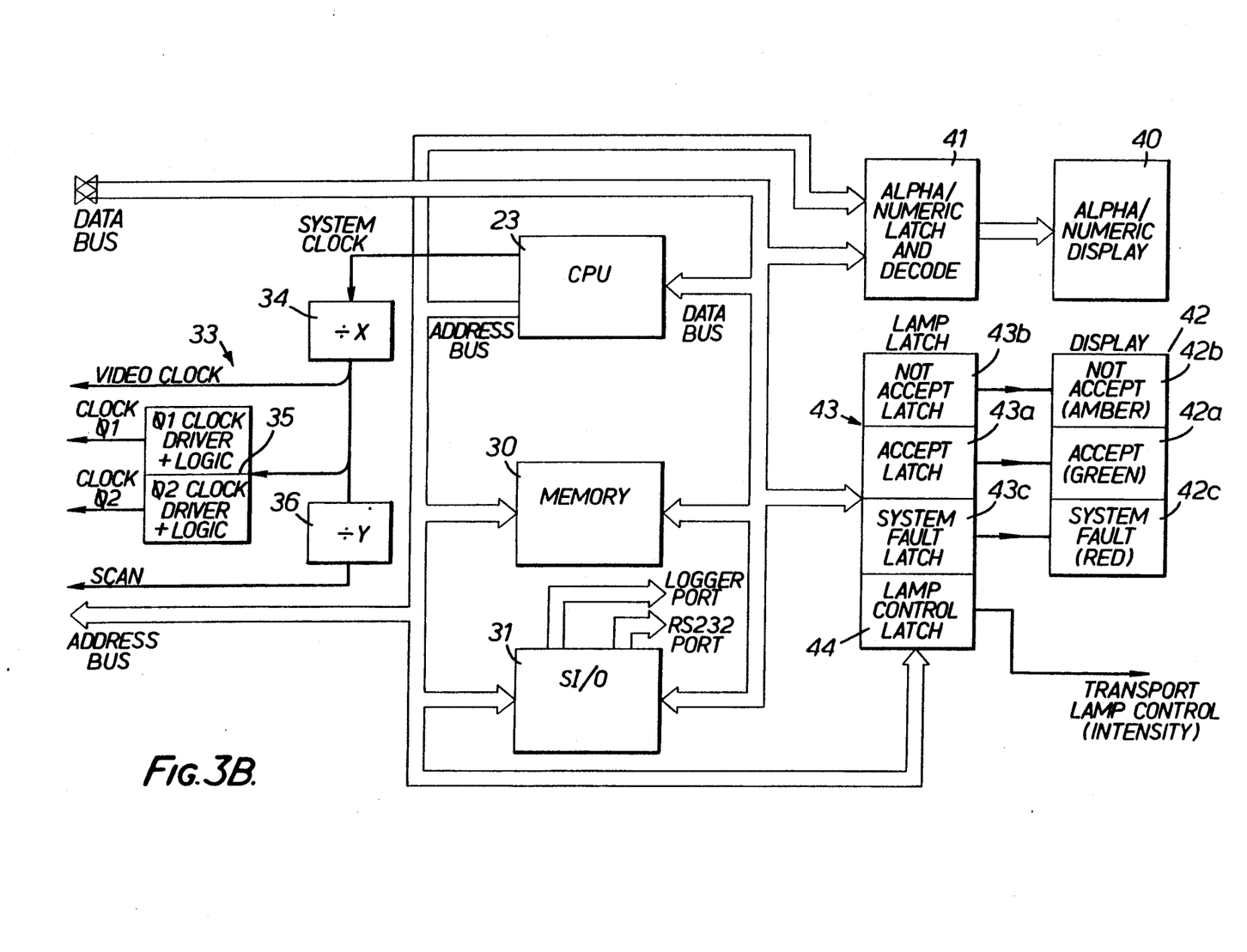

Turning now to FIGS. 3A and 3B, these show schematically how the computer 15 is arranged. The video signal processor 16 generates a continuous analogue video output which is fed to a level detector 20 and to an auto-threshold circuit 21 which are used to digitise the analogue output. The analogue video output is defined as being block or white dependent upon whether it is greater or less than a reference level fed to the level detector 20 from the auto-threshold circuit 21.

Figure 4:
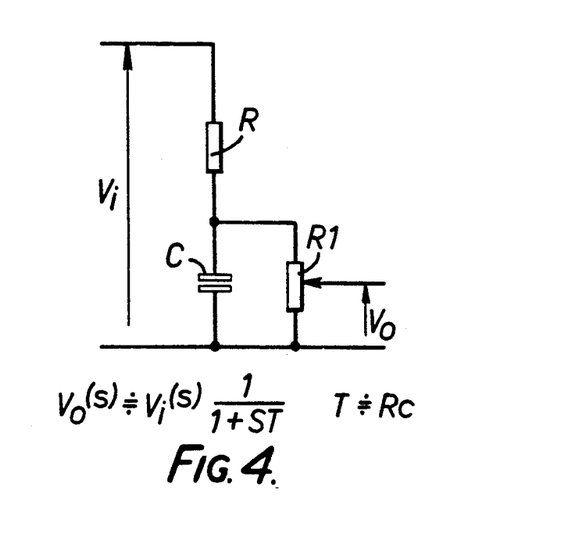
FIG. 4 shows a detailed circuit diagram of a part of the circuit diagram shown in FIG. 1.

It is desirable that the reference level be related to the video signal in which a way that it responds to long term changes in the level of the video signal brought about by such things as variations in lamp intensity, cheque background reflectivity etc., in a proportional manner. It should be insensitive however to rapid changes in video signals which occur as the signature or the code is being scanned. To achieve this "auto threshold" characteristic, the circuit 21 is seen from FIG. 4 to comprise a simple integrator circuit combination of a resistance R and a capacitance C across which the input analogue video signal is placed. The junction between the resistance R and the capacitance C is connected to one end of a further resistance R1 connected in parallel with the capacitance C. A scaled output $V_o$ is derived from the resistance R1. The time constant of the integrator circuit is chosen so that the break point frequency is below the scan frequency making the DC component of the signal dominant with a decreasing AC contribution with increasing frequency.

To optimise the ability of the equipment to provide accurate data from the information being scanned on the cheque, the reference level derived from the circuit 21 applied to the level detector 20 can be changed by means of an output from a level latch 22 under software control. The contents of the latch 22 are set by a data bus from a CPU 23 (FIG. 3B).

The output from the level detector 20 is a "digital" signal which is made available to the micro-computer system via a video data buffer 24 after having passed through a data latch 25 which is repeatedly re-latched at the commencement of each video clock period by the VIDEO CLOCK signal derived from the clock signal generator of the micro-computer. The video data buffer 24 is provided with a number of control signals which are used to validate the data present to it from the data latch 25. Firstly, an extended SCAN pulse is provided to the buffer 24 from a scan latch 26 which has, as inputs, the SCAN pulse and the VIDEO CLOCK pulse generated by the clock signal generator of the micro-computer system. The output of the scan latch 26 is an extended SCAN pulse which is latched for one VIDEO CLOCK period. The VIDEO CLOCK signal is also fed directly to the buffer 24. Additionally, an indication of whether or not a cheque is in place in the scanning location of the transport system is generated by a detector 27 (FIG. 1) and fed as an enable signal to the buffer 24.

The buffer 24 is addressed by the micro-computer via an address bus and its data content is loaded onto a data bus for further processing by the micro-computer system. The video data buffer input is updated continuously as a cheque passes through the transport. The software is designed to poll asynchronously the information present in the video data buffer 24 at a rate which ensures any changes in the video data are seen by the micro-computer.

Turning now to FIG. 3B, this shows in more detail the structure of the micro-computer system as well as the details of the clock signal generator circuit and the indication circuitry for providing an indication of whether a signature is valid or not. It will be seen that the micro computer system is made up of three main elements namely a CPU 23 for carrying out data processing, a memory 30 to provide storage for the operating system plus all the data derived from scanning a cheque, and an input/output section 31 to provide an RS 232 interface plus a logger interface for data acquisition.

The clock signal generator circuitry which is indicated generally by the reference numeral 33 operates on the micro-computer system clock signal generated by the CPU 23 which is divided down in a divider circuit 34 by value X to provide the VIDEO CLOCK signal which is used as already described in relation to FIG. 3A. The frequency of the VIDEO CLOCK signal has a period which is to equal one array element interrogation period. This signal is split by additional logic 35 to provide a two-phase CLOCK SIGNAL clock $\phi1$ and clock $\phi2$ required to scan the array. To provide the SCAN pulse to initiate each array scan further sub-division of the video clock signal by a value Y is carried out by a divider circuit 36, the value of Y is equal to the number of elements in the array.

The micro-computer system further includes indicator circuitry for indicating whether or not a signature is valid. In FIG. 3B, two types of display are shown but it is to be understood that in certain circumstances only one type of display may be required.

The first type of display is a multiple character alpha/numeric display 40. This display is driven by decoding logic circuit 41 which accepts data from the data bus, suitably decodes it, and then presents it to the display in a latched form. Information presented may take the form of data and/or actual decisions.

A simple lamp display 42 can also be provided. In this embodiment there are three lamps, namely:
(1) An "accept" lamp 42a indicating when the overall figure of merit is acceptable;
(2) A "cannot confirm" lamp 42b indicating when the value of the figure of merit is not within the acceptable range; and (3) A "system fault" lamp 42c indicating a system irregularity e.g. a fault or mal-operation of the equipment.

Each of these lamps is driven by its own respective latch 43 each connected to the data bus.

A latch 44 connected to the data bus when addressed by the CPU generates a control signal which is sent to a switching circuit 45 (FIG. 1) for controlling the intensity of the light source for the scanning system.

This circuit enables the verification apparatus to operate with minimum power dissipation and also extends the life of the light source 11 since extended life can be achieved by keeping the light source 11 energised at a reduced voltage when the apparatus is in the "idle" mode awaiting a further verification procedure. The supply switch 45 is provided with a dual voltage supply V1, V2 and switches between the dual voltage supplies under the control of the signal generated from the latch 44 shown in FIG. 3B. When the "cheque in place" signal from the detector 27 is generated the latch 44 is set by the CPU 23 this controls the switch 45 such that the full voltage V2 is applied to the lamp. When there is no "cheque in place" signal the reduced voltage V1 is applied to the lamp. The mechanical position of the detector 27 is chosen so that there is a sufficient lead time to enable the light source to achieve full luminosity before cheque scanning commences. The micro-computer system is designed to respond to the "cheque in place" signal going false by re-setting the lamp voltage to its reduced value V1 after a delay which allows the cheque to clear the transport system.

Figure 5A:
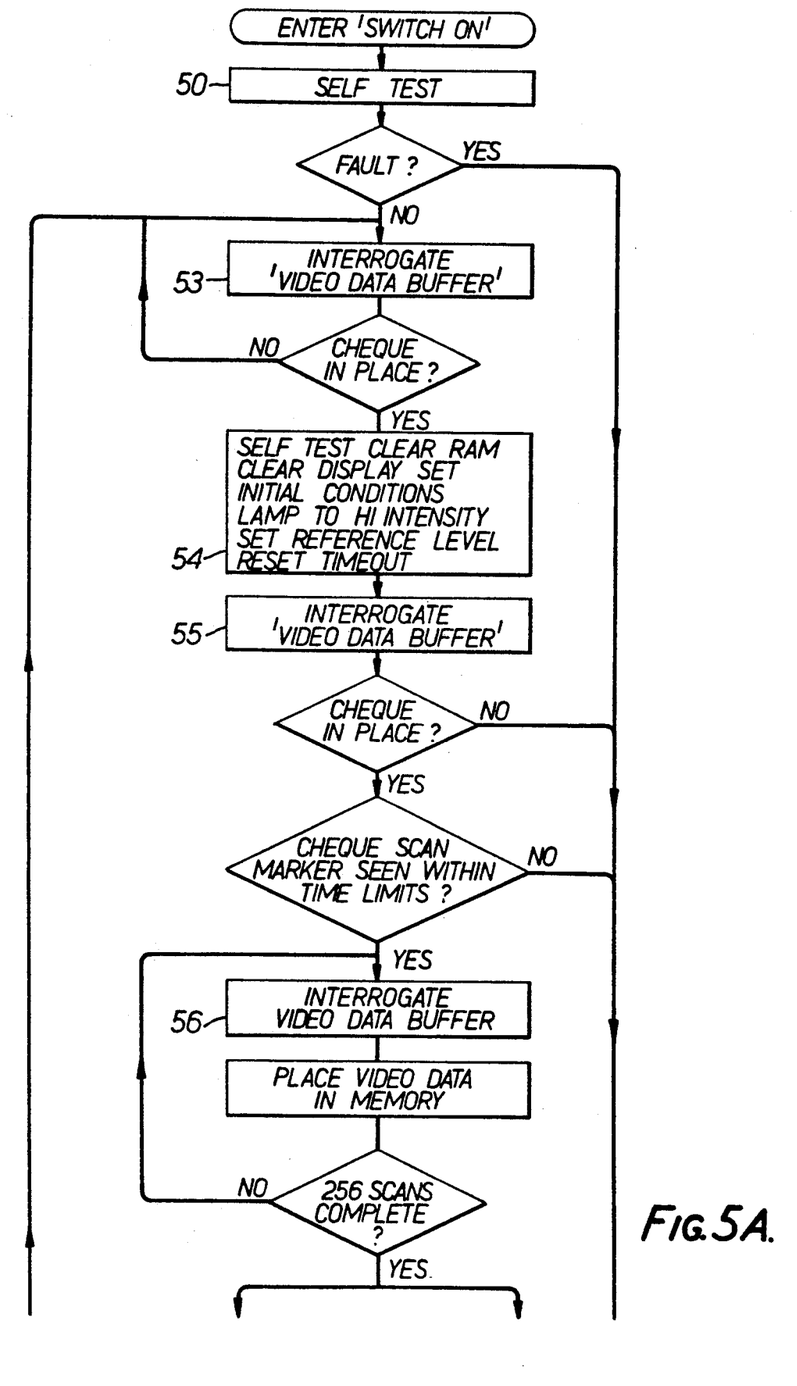
FIGS. 5A and 5B show a flow diagram of the software used by a computer used in FIG. 1.
Figure 5B:
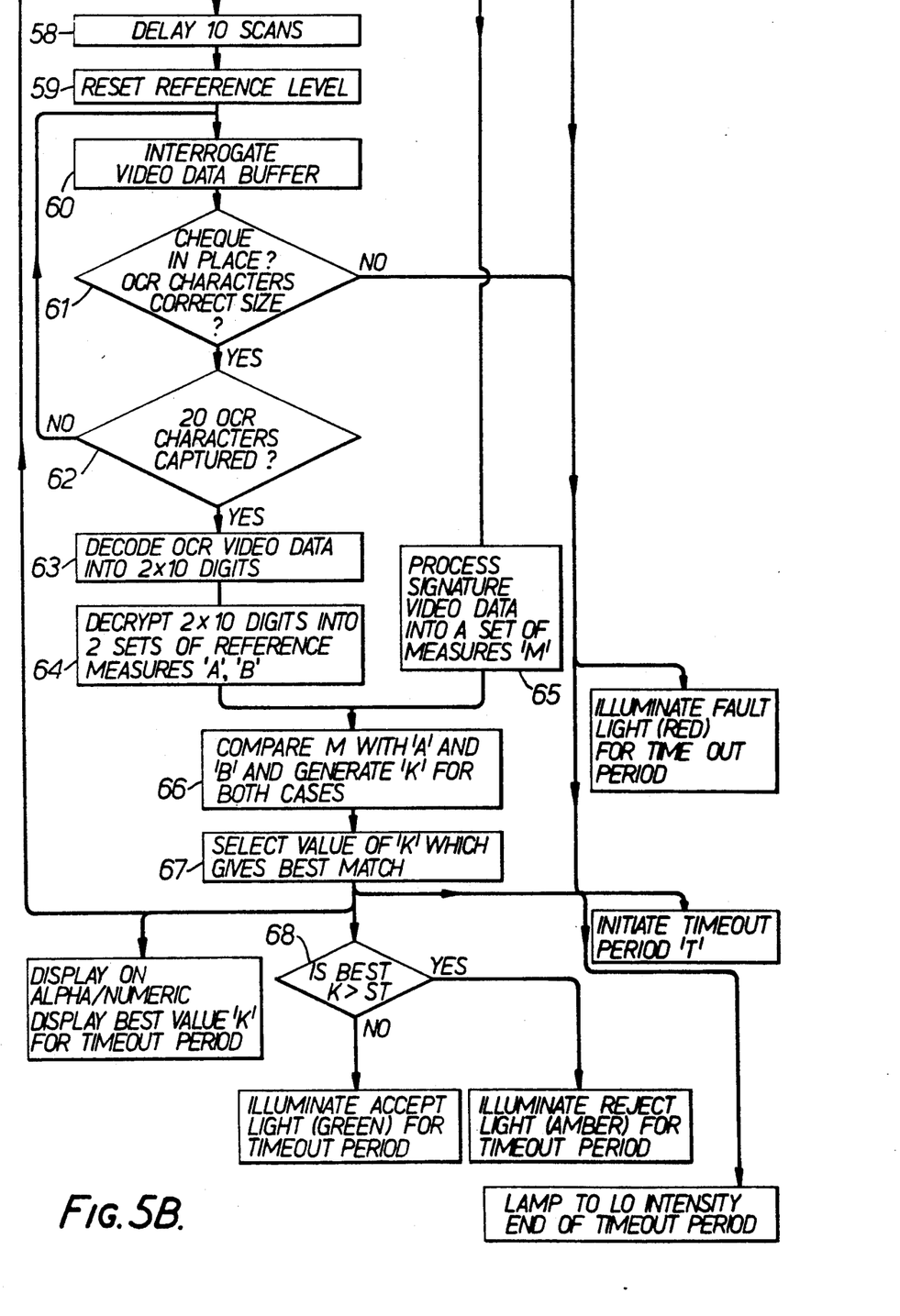

In order to provide a better understanding of the operation of the micro-computer system, attention is now directed to FIGS. 5A and 5B which together make up the flow diagram of the software for the micro-computer. FIGS. 5A and 5B will also be used as the basis for a description of how the apparatus operates to carry out the verification process.

On switching on the apparatus, the micro computer conducts a "self test" routine as indicated by the block 50 and if a fault is found a signal is fed to the system fault latch 43c so as to illuminate the system fault display lamp as indicated by the block 51. Simultaneously, a further signal is sent to the lamp control latch 44 to ensure that the light source 11 is energised at a reduced voltage as indicated by the block 52 in FIG. 5B.

If the self test routine is satisfactory, the micro computer then interrogates the video data buffer 24 as indicated by the block 53 and firstly determines whether or not the buffer 24 contains a "cheque in place" signal. If it does not, the micro-computer system continues to interrogate the video data buffer 24 until such time as a "cheque in place" signal is present in the buffer whereupon the processor moves on to a further more extensive routine as indicated by the block 54 where the processor again conducts a self test routine, clears the memory 30, clears the display 40 and/or 42, sets all necessary initial conditions required by the apparatus, sends a signal to the lamp control latch 44 in order to energise the light source 11 from the high voltage line V2, sets the contents of the level latch 22 which is used in the digitising apparatus and also re-sets a timing circuit which sets the overall time within which a signature verification process may take place. Once all these steps have been taken the video data buffer 24 is again interrogated as indicated by the block 55 and once more the buffer 24 is interrogated to ensure that there is a "cheque in place" signal in the buffer 24. If there is not, this indicates a fault condition which again is used to indicate a fault condition as shown by the block 51 and to reset the lamp to a lower intensity as indicated by the block 52. If however, there is still a "cheque in place" signal the micro processor now interrogates the buffer 24 to ensure that the VIDEO CLOCK and extended SCAN signals contained therein are present within the necessary time limits. If they are not, then again a fault is indicated and the lamp is switched to low intensity at the end of the time out period. If, as is usual, these signals are present then the buffer 24 is again interrogated as indicated by the block 56 and the data contained therein is fed to the memory 30 via the data bus.

This operation of interrogating the buffer 24 and placing the data contained therein into memory is conducted cyclically until a predetermined number of scans has been completed. The number of scans is determined by the length of the area of the cheque 10 being scanned relative to the distance travelled by the cheque during each scan. In this case, it has been determined that 256 scans will completely scan the whole of the signature box to the desired resolution and once these scans have been completed and the signature data loaded into memory the processor moves on to conduct the scanning of the codes and this will be described in more detail in relation to FIG. 5B.

After conducting the 256 scans of the signature box, the processor delays the next 10 scans as indicated by the block 58 and then, as indicated in block 59 resets the reference level of the digitising circuitry ready for the scanning of the code or codes. Once this has been done, the video data buffer 24 is again interrogated as indicated by the block 60 to ensure that the cheque is still in place. If it is not then once more the fault is indicated using the block 51 and the intensity of the light sources is again reduced as indicated by the block 52. Further, it is assumed in this case that the code is in the form of OCR characters in which case there is a predetermined video data output which indicates whether or not the characters are of the correct size. The processor therefore, as indicated by the decision block 61 interrogates the video data contained in the buffer 24 to see if OCR characters of the correct size are being used and if so it then proceeds to load the data representing the OCR characters into the memory 30. As indicated by the decision block 62, once a predetermined number of OCR characters have been captured in this way the program moves on. In the present example it is assumed that there are two codes each of ten OCR characters and therefore the micro-computer will continue to interrogate the video data buffer 24 until 20 OCR characters have been captured. Once this has been done the scanning operation is complete and the micro processor then moves into a decoding and decision making routine indicated by the blocks 63 to 68.

Firstly, the data representing the 20 OCR characters are decoded into the two ten character codes as indicated by the block 63 and then the or each code is decrypted into a set of "reference measures" A or two sets A and B by the block 64 and the values of these reference measures are held in the memory 30. The processor then processes the signature video data produced by the 256 scans to produce equivalent actual measures "M" for the submitted signature in the block 65 and then compares this set of actual measures with the or each set of reference measures which are held in memory (30) and generates, in the block 66, a figure of merit K which defines the degree of similarity between the reference measures and the measures actually determined from the signature.

Figure 6:
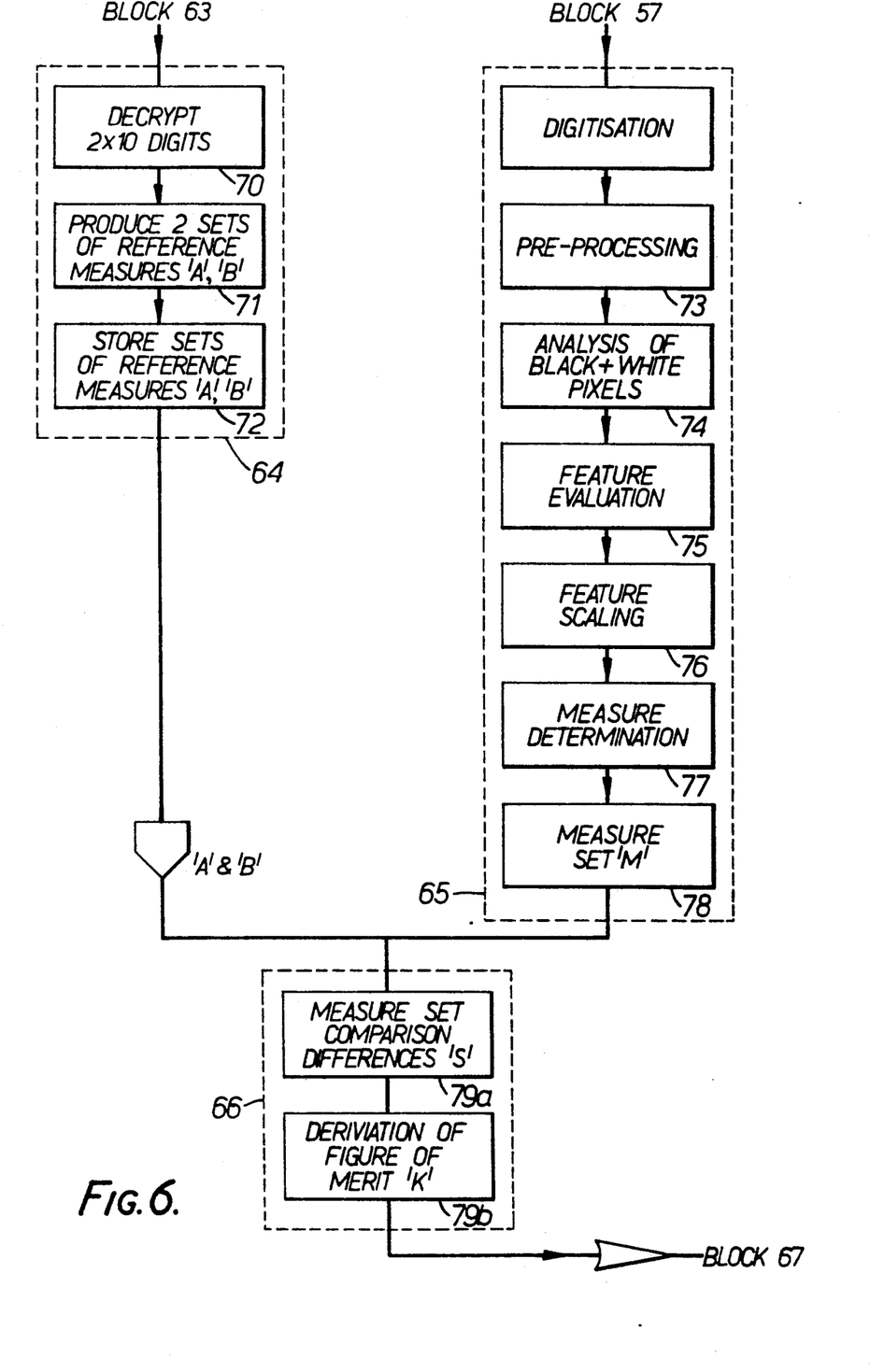
FIG. 6 shows a further flow diagram for explaining in more detail a part of the software.

Turning now to FIG. 6, this shows in more detail how blocks 64,65 and 66 of FIG. 5B processes data to produce the factor "K". Dealing firstly with block 64 which decrypts each OCR code read from the cheque, the encrypted signature record code is initially processed to decrypt the code as indicated by the block 70, the decrypted code is then subjected to an algorithm in the block 71 to produce a set of reference measure values for each signature record code which is stored as indicated by block 72 for comparison with a set of values derived from the offered signature as will now be described.

The video data representing a submitted signature is preprocessed first of all (block 73) to eliminate noise introduced in scanning and thresholding. The digital representation of the submitted signature held in memory 30 is in the form of a matrix, e.g. if 64 photoelements in a linear array are used in scanning with 256 scans across the signature box, a 256×64 matrix of pixels is produced. This matrix is filtered to effectively smooth the digital image of the signature. One preferred method is to apply a 3×3 window operator to each portion of the matrix successively. The operator acts on each group of 3×3 elements in the matrix to produce a weighted sum of the element values. The weighting is such that the value of the central element in the windowed group has greater effect on the final sum than that of an edge or corner element. In practice since there are only 512 possible configurations of element values in the 3×3 window it is simpler to use "look-up" tables in computer memory to find each weighted sum rather than to use hardware logic or software. Once each weighted sum is produced it is assigned a value of "1" or "0" defining black or white pixels depending on whether or not it exceeds a further, settable threshold value.

The effect of pre-processing is to produce a second processed matrix which is smoothed and hence more representative of the submitted signature. The computer software then carries out analysis of particular extended features in this processed matrix.

There are a large number of different extended features in a signature which could be used in signature verification, however it is important to choose features whose values will not be common to large numbers of people and which will not be open to substantial variation for the same author. It is also important to eliminate any dependence on artificial signature features, such as the thickness of the pen stroke (caused by the particular writing instrument used). Some preferred features which could be analysed are related to a) the total ink line forming the signature;
b) the vertical strokes forming the signature;
c) the horizontal strokes forming the signature;
d) the direction of the slopes forming the signature;
e) the complexity of the signature; and
f) the size and disposition of the signature having regard to the signature box.

The method by which features are analysed varies somewhat depending on which particular feature is concerned, however, a detailed description of the method used to analyse two features will clearly illustrate the techniques involved.

A useful feature to analyse is the total length of the ink line forming the signature ((a) above). To assign a value to this feature the computer is used to count the digital "1"s in the processed pixel matrix which correspond to black pixels, i.e. ink marks in the signature box. However, counting all the black pixels would give a measure of the signature density in the signature box not of the length of the ink line. The computer must analyse the elements of the processed matrix, in particular those representing black pixels, to determine which black pixels are at the edges of the ink line (block 74), i.e. which black pixels have at least one white neighbour. So the computer evaluates which elements in the matrix are line edge elements then counts the total number of line edge elements and this total for a scaled version of it) is used as a value for the total length of ink line feature (block 75).

By analysis of the relative positioning of black to white pixels and of black pixels to each other a number of other features may be evaluated in a similar way. For example, to find a value representing the total number of vertical strokes in the signature the computer would evaluate the number of black pixels in line edges which lie in a vertical relationship with other line edge black pixels.

Relatively simple signature properties such as the length or height of the signature in the signature box can be adapted to provide useful features for verification purposes by normalising them with respect to the total length of the ink line with the signature box. Such normalisation tends to remove the dependence of these simple features on the size of the signature being analysed.

Similarly, simple properties of a signature may be evaluated from the processed pixel matrix and then their ratio taken and used as a feature of the overall signature. Care must be taken that the properties which are combined are not dependent on each other, since the interdependence produces a feature which is not significant.

Another type of feature used in the invention is related to the distribution of ink in the signature box, e.g. the position in the signature box of a vertical/horizontal line which leaves equal amounts of ink in the box portions on either side of it. Since the signature box tends to act as a constraint such features are useful for identifying authors. Also many signatures end with a flourish which may stretch away from the body of the signature of bend back to underline or overscore it. These fluorishes are usually variable for the same author so it is useful to analyse some features which exclude fluorishes, i.e. which are in the first portion of the signature. To analyse this type of feature it is necessary to define a co-ordinate system related to positions in the signature box. The signature box is represented by the processed matrix stored in the computer memory, however because of the scanning process the signature information is essentially backwards in the processed matrix. Thus a large amount of ink in the first half of the signature box corresponds to a large number of black pixels (i.e. digital "1"s) in the second half of the processed matrix considering the matrix as a 2-dimensional array. Similarly features of the first portion of the signature appear in the second half of the processed matrix. The analysis of such a feature, termed the "second half vertical 50%" will now be described in detail by way of example.

Considering the processed matrix as a 2-dimensional array, the "second half vertical 50%" is the position in the array of a horizontal line which cuts the second half of the signature so that 50% of the black pixels in that half lie above the line and 50% lie below it. The "second half of the signature" is taken here to mean that portion of the matrix containing 50% of all the black pixels in the whole processed matrix and representing the right hand portion of the submitted signature.

To analyse the second half vertical 50% the computer first of all sets up an x-y co-ordinate system corresponding to positions in the processed matrix. The total number of black pixels in the processed matrix are counted (i.e. the total number of digital "1"s) and the computer finds the x co-ordinate of a vertical line dividing the black pixels into even halves. The computer next considers only those black pixels representing the right hand of the signature. The computer counts those black pixels and locates the y co-ordinate of a horizontal line dividing the black pixels into even halves. This y co-ordinate is stored as a measure of the "second half vertical 50%".

Clearly there are many features which could be used to classify a signature, particularly if ratios of feature values are considered as secondary features, but not all of these are useful characteristics or suitable for signature verification purposes. Any features which require a long processing time are generally unsuitable. The number used in verifying the signature is largely determined by:

i) the need to keep processing time to a minimum; and
ii) the space available on a suitable carrier medium, e.g. a bank cheque, for the coded reference measure values.

A suitable number of features to use in the invention is ten since there is space on a standard bank cheque for two sets of ten OCR characters (which would be needed to encode signature measure values for a joint account).

Once the computer has analysed all the selected features they are scaled to give measure value (block 76). One convenient scaling technique is to assign a value from 0–9 to each feature (as its measure value) depending on its position in the overall distribution of that feature in a large population. This is achieved by dividing the feature population into ten-percentiles and ascertaining in which ten-percentile of the distribution the feature as analysed lies. The feature population distribution data may be stored in computer memory (30) or, if the invention is used as a terminal device, stored in a central database. The set of measure values "M" for the submitted signature is produced by determination of the percentile values and is held in computer memory (30).

The computer next compares each individual measure value from "M" with the corresponding reference measure value from the set "A", or if there are two sets of reference measure values "A" and "B" compares with each of the reference sets successively (block 79). A difference, δ, is calculated between the actual value and the reference value, a function is applied to the set of differences and then they are combined to give a figure of merit "K". The function weights difference values according to their size (since a larger difference is much more significant than a small difference) and according to the particular feature involved (since certain features vary inherently even for the true author whereas others will give more constant measure values). A suitable function would be to raise each difference value to a power n where n is varied depending on the particular feature concerned. The resultant set of weighted differences would then be combined together to give value "K". If two sets of coded reference measures were supplied on the record medium two values for "K" would be produced.

On the assumption that there are two or more codes present, the processor then selects the value of the figure of merit which gives the best match with one of those codes in the block 67 and produces an output indicative thereof to a decision block 68 where the best figure of merit value is compared with a predetermined standard threshold value. If the figure of merit value is greater than the standard value a signal is fed to the not accept latch 43B in order to illuminate the "not accept" lamp 42B. If the figure of merit value is less than the standard value then a signal is fed to the accept latch 43A in order to illuminate the accept lamp 42A.

If desired it is also possible to alternatively or additionally display the actual figure of merit value via the decoder and latch 41 and the display 40.

The above apparatus is thus a simple piece of apparatus which has no operator controls other than an on/off switch and uses a normal single phase AC power supply. In tests, it has been shown that the apparatus will detect virtually 100% of unseen forgeries. An unseen forgery is where a person writes another person's signature in his own hand. Further seen forgeries have been detected 95% of the time. A seen forgery is where a person copies another person's signature e.g. from the cheque card or credit card.

The apparatus capability for forgery detection is largely determined by the setting of the threshold value against which "K", the figure of merit, is judged. Raising this predetermined threshold value increases the percentage of true signatures which are not verified. Lowering the threshold value leads to a greater percentage of true signatures being verified but there is a corresponding increase in the number of undetected forgeries. For economic and commercial reasons a useful compromise is reached using a threshold setting where 95% of forgeries are detected and 95% of true signatures are verified.

From the above description, it will be apparent that the encoder device required in order to provide a cheque or credit card with the signature record code indicative of the reference/true signature is very similar to the above arrangement in that the encoding apparatus will require all the scanning and video processing apparatus described above. The software for the microcomputer will differ in so far as it will only deal with the scanning of the sample signature and the storing of the video data from the or each 256 scans in the equivalent of the memory 30 since no OCR character will be present. In other words, it will operate substantially identically to the description for FIG. 5A. However, after the data from the or each 256 scans has been completed, the processor will then move to the equivalent of block 65 in FIG. 5B where it will process the sample signature into sample measure values. When all of the sample signatures have been processed there will be a set of values for each measure, a reference value for each measure can be produced by taking the mean or median of each group of values. A preferred method of deriving the reference value for each measure is to calculate the value at which for any of the sample values the maximum excursion from the reference value of that measure is a minimum. The set of reference measure values will then be encoded into a 10 character OCR code which can then be printed on a cheque or credit card or embossed on a credit card or otherwise recorded thereon. Encryption of the measure values can also be incorporated into the system for greater security.

When dealing with cheque and credit card fraud, it will be appreciated that the above disclosed apparatus is of significant commercial value due to the fact that the encoding apparatus can be retained by the banks or credit card companies while the verification apparatus need not be connected in any way to the issuing banks or credit card companies since it is a "stand alone" device. A further significant advantage is the relatively low cost of the verification apparatus which will encourage its wide spread use.

The above description has been given on the basis that the verification apparatus has available to it from the cheque or credit card the code indicative of the reference/true signature. It is within the scope of this invention for the verification apparatus to be connected on line to a host central computer which stores the code.

As a modification, it is possible to replace the reflected light technique described above by a transmitted light technique.

We claim:

1. A signature verification system including:
  a) an encoding apparatus comprising means for illuminating a predetermined area on a carrier medium where at least a portion of a sample signature would be expected to be, means for scanning said predetermined area to produce signals representing the sample signature, means for processing said signals to produce a black and white pixel representation of the sample signature within the predetermined area, means for analysing the black and white pixel representation and evaluating the number of pixels which satisfy criteria associated with each of a plurality of preselected features of the sample signature, said preselected features including a ratio of numbers of pixels in the black and white pixel representation satisfying different criteria, means for scaling each of said numbers of pixels to produce a measure value for each of said plurality of preselected features, and means for producing a set of reference measure values representative of at least one sample signature from the measure values produced representative of at least one sample signature; and
  b) verification apparatus comprising means for illuminating a predetermined area on a further carrier medium where at least a portion of an offered signature would be expected to be, means for scanning said predetermined area to produce signals representing the offered signature, means for processing said signals to produce a black and white pixel representation of the offered signature within the predetermined area, means for analysing the black and white pixel representation and evaluating the numbers of pixels which satisfy criteria associated with each of said plurality of preselected features of the offered signature, said preselected features including a ratio of numbers of pixels in the black and white pixel representation satisfying different criteria, means for scaling each of said numbers of pixels to produce a measure value for each of said plurality of preselected features the measure values forming a set which is representative of the offered signature, means for comparing the set of reference measure values for the at least one sample signature with the set of measure values for the offered signature and indicating the result of the comparison.

2. A system according to claim 1, wherein the encoding apparatus includes encryption means connected to the means for producing a set of reference measure values for producing an encrypted version of the set of reference measure values representing the at least one sample signature, and means for recording the encrypted version of the set of reference measure values on a record medium in a machine readable form, and wherein the verification apparatus includes means for reading the encrypted version of the set of reference measure values from the record medium and decryption means for generating the set of reference measure values representing the at least one sample signature from the read encrypted version thereof.

3. A system according to claim 2, wherein the record medium is selected from a banking debit voucher, a cheque, a bank card and a credit card.

4. A system according to claim 2, wherein the record medium constitutes the further carrier medium.

5. A system according to claim 1 wherein one of said plurality of preselected features is the total length of ink line of the signature within the predetermined area and at least one of said numbers of pixels is normalised in relation to the number of pixels satisfying criteria associated with the total length of ink line feature.

6. A signature verification apparatus for use with a carrier medium bearing an offered signature for comparison with a code, said apparatus comprising means for illuminating a predetermined area on the carrier medium where at least a portion of an offered signature would be expected to be, means for scanning said predetermined area to produce signals representing the offered signature, means for processing said signals to produce a black and white pixel representation of the offered signature within the predetermined area, means for analysing the black and white pixel representation and evaluating numbers of pixels which satisfy criteria associated with each of a plurality of preselected features of the offered signature, said preselected features including a ratio of numbers of pixels in the black and white pixel representation satisfying different criteria, means for scaling each of said numbers of pixels to produce a measure value for each of said plurality of preselected features the measure values forming a set which is representative of the offered signature, means for inputting a code indicative of a true signature, means for producing a set of measure values representing the true signature from the inputting means, and means for comparing the set of measure values for the true signature with the set of measure values for the offered signature and indicating the result of the comparison.

7. Apparatus according to claim 6 wherein the carrier medium bears a machine readable code representing the true signature and there is further provided code scanning means to produce signals representing the code.

8. Apparatus according to claim 7 wherein a plurality of machine readable codes are located on the carrier medium, the code scanning means is arranged to produce signals representing each of the codes, and the producing means is arranged to produce a set of measure values for each of the codes, the comparing means compares the set of measure values representing the offered signature with each set of measure values representing a code.

9. Apparatus according to claim 8 wherein there is a single scanning means and a transport system is provided for passing the carrier medium past the single scanning means whereby to sequentially scan the offered signature and the plurality of codes.

10. Apparatus according to claim 6 wherein one of said plurality of preselected features is the total length of ink line of the signature within the predetermined area.

11. Apparatus according to claim 10 wherein at least one of said numbers of pixels is normalised in relation to the number of pixels satisfying criteria associated with the total length of ink line feature.

12. A system verification apparatus for use with a record medium bearing an offered signature to be tested against a code, the apparatus comprising:

means for illuminating said offered signature as on said record medium;

means for scanning said offered signature as illuminated to produce a black and white pixel representation of that signature;

means for feature analysing the pixel representation to produce digital signals representative of plural features of said signature including a ratio of numbers of pixels in the black and white pixel representation satisfying different criteria;

means for combining said signals representative of plural features to provide a resultant signal representing said offered signature; and means for comparing said resultant signal with said code to provide a verification indication.

* * * * *